Oct. 23, 1934.   O. C. KAVLE   1,978,136
STAMPING MACHINE
Filed Sept. 26, 1932   2 Sheets-Sheet 1
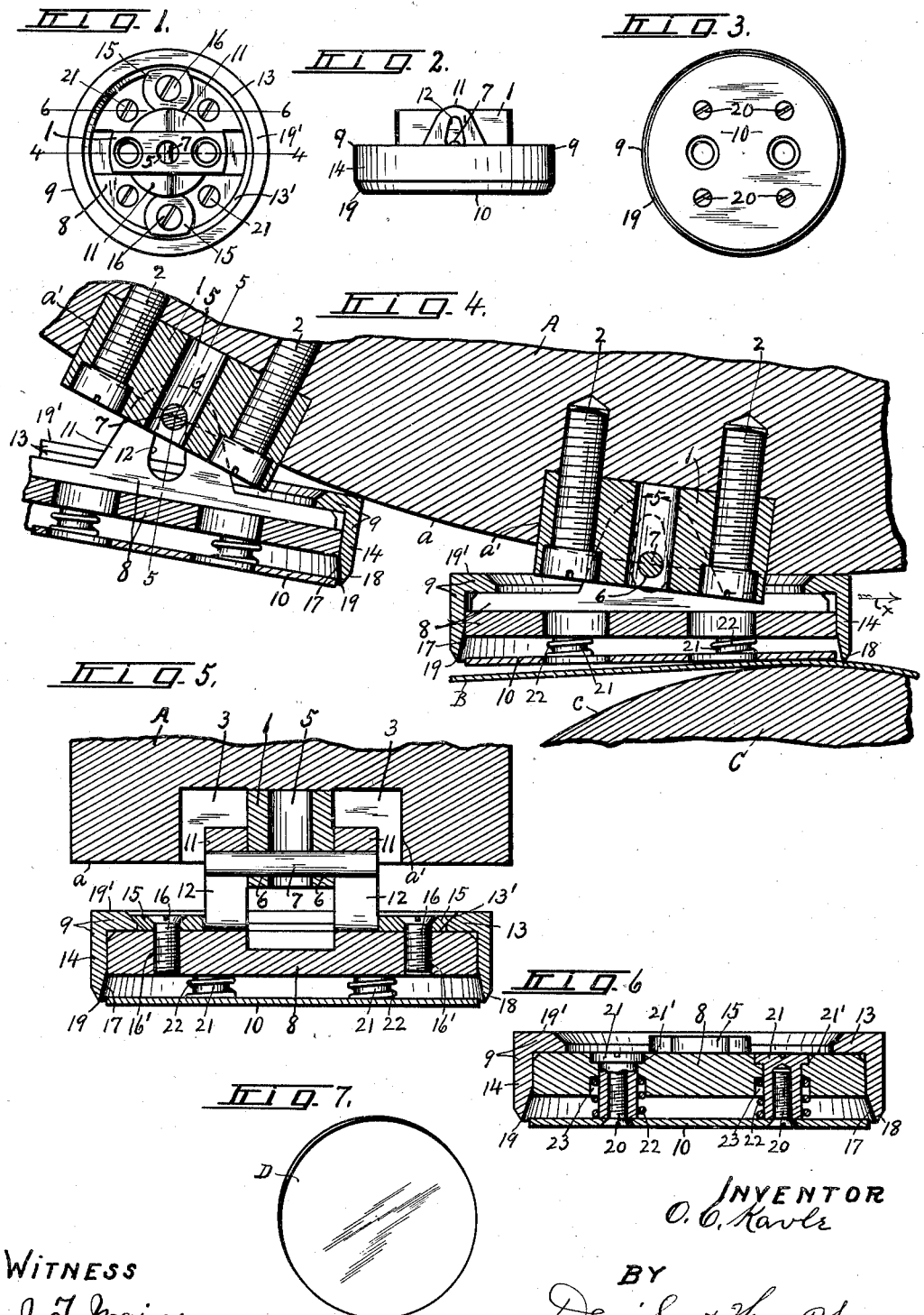

Oct. 23, 1934.  O. C. KAVLE  1,978,136
STAMPING MACHINE
Filed Sept. 26, 1932  2 Sheets-Sheet 2
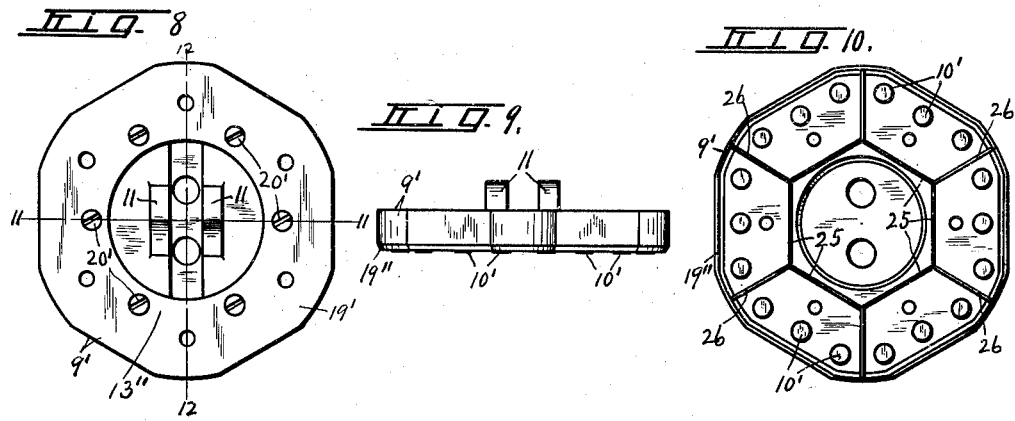
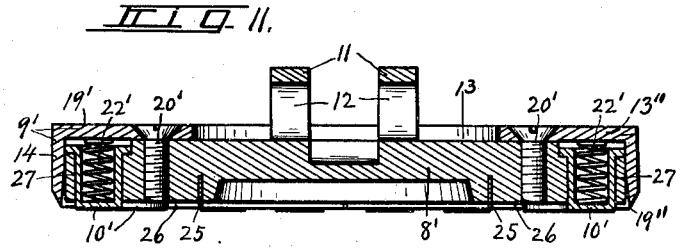
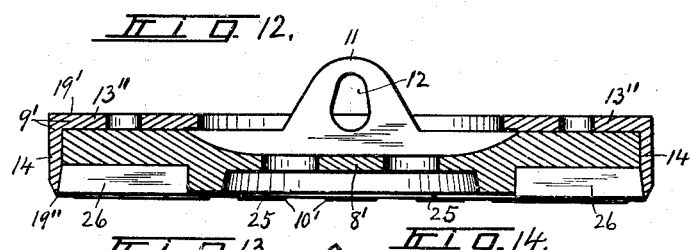
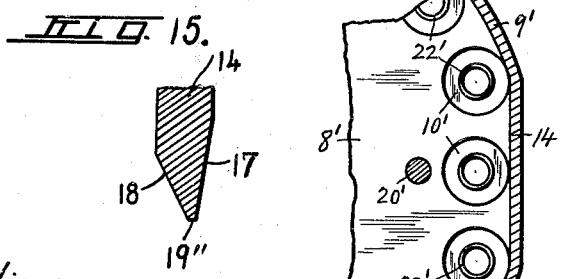
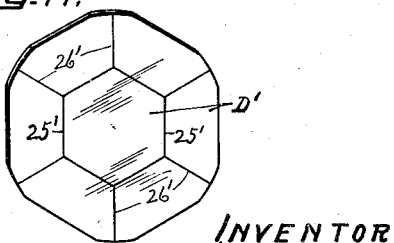
INVENTOR
O. C. Kavle
BY
Denison & Thompson
ATTORNEYS
WITNESS
J. J. Mains Patented Oct. 23, 1934

1,978,136

UNITED STATES PATENT OFFICE 1,978,136

STAMPING MACHINE

Oscar C. Kavle, Syracuse, N. Y.

Application September 26, 1932, Serial No. 634,887

6 Claims. (Cl. 164—28)

This invention relates to a stamping machine of the class set forth in my Patent No. 1,825,069 dated September 29th, 1931 for cutting milk bottle caps and other forms of disks from sheets of paper or other suitable material and refers more particularly to the construction of the cutter units and to the manner of mounting them upon the rotary carrier.

Each cutter unit is provided at one end with a cutting edge extending around its axis in a plane at right angles to said axis and has its other end provided with a bearing surface parallel with the plane of the cutting edge, and the main object is to feed the sheet material and cutters simultaneously and continuously by and between opposed rollers in such manner that the cutting units will automatically assume positions tangential to the contiguous faces of the rollers while passing between the same.

Under this construction and operation, the cutting and stamping configurations may obviously be made to the required form for reproduction with greater ease, economy and accuracy than would be possible upon a cylindrical surface particularly when the latter is rotated in cooperation with a rotary platen for feeding and cutting purposes.

In the patent referred to and also in the present invention, the cutting units are hingedly mounted upon one of the rolls in such manner that they will automatically assume positions tangential to the adjacent faces of both rolls for cutting or impressing their configurations on the sheet as the latter is fed by and between said rolls.

I have found, however, that with certain improvements in the construction of the cutter units and in the means for attaching them to the rotary carrier as embodied in this invention, the efficiency, durability, speed of operation and resultant output of the machine may be greatly increased.

To this end, one of the objects is to mount the pivotal pins for the several cutting units upon the rotary carrier in such manner that their axes will lie in the circular pitch line or periphery of the carrier to prevent feeding effect of the carrier against the pins while the cutter units are passing between the rollers and thereby to cause said units to be fed by the rollers independently of the pins.

Another object is to make the cutting element separate from its supporting block and to enable it to be adjusted rotarily about its axis at will for presenting different portions thereof to the point of initial engagement with the work and thereby to prevent excessive wear of the cutting edge at any one point in its circumference.

A further object is to make the axial depth of the cutter ring between the cutting edge and opposite end bearing face slightly less than the distance between the contiguous faces of the feeding rolls so as to prevent direct contact of said cutting edge with the platen roll and at the same time to assure a sufficient penetration of the cutter into the work to enable the portion within the cutter to be easily separated from the remnant by the ejector as each cutting operation is completed.

Other objects and uses will be brought out in the following description.

In the drawings:—

Figures 1, 2 and 3 are respectively an inverted plan, a side elevation, and a top plan of one of the cutting units.

Figure 4 is an enlarged sectional view of a portion of the rotary carrier and also a portion of the opposed platen showing enlarged sections of two of the cutters and their means of attachment to the carrier, the section of one of the cutter units being taken on line 4—4, Figure 1.

Figure 5 is a sectional view taken on line 5—5, Figure 4.

Figure 6 is an enlarged sectional view taken on line 6—6, Figure 1.

Figure 7 is a perspective view of one of the discs cut from the sheet material by one of the cutters.

Figures 8, 9 and 10 are respectively a top plan, a side elevation, and an inverted plan of a modified cutting unit for cutting a different form of disk from the sheet material.

Figures 11 and 12 are enlarged sectional views taken respectively on line 11—11 and 12—12, Figures 8.

Figure 13 is a fragmentary detail sectional view taken on line 13—13, Figure 11.

Figure 14 is a perspective view of one of the disks formed by the cutting unit shown in Figure 8.

Figure 15 is an enlarged sectional view through a portion of one side of the cutter ring in which the cutting edge is substantially flat and parallel with the opposite end face.

The mechanism shown in Figures 1 to 6 inclusive is adapted to be used more particularly for cutting circular bottle caps or similar disks from sheet material such as paper cardboard or analogous substance, and for that purpose a plurality of the cutting units are mounted upon a rotary carrier A to be fed thereby together with the sheet material as B between the periphery of the carrier A and that of an opposed platen C, as shown more clearly in Figure 4.

That is, the carrier A is provided with a circular peripheral bearing face $a$ for engaging one end of each cutting unit, while the platen C is also provided with a circular peripheral bearing face $c$ for engaging the sheet material B and cooperating with the peripheral bearing face $a$ for feeding the sheet material and cutting units between them in a manner presently described, it being understood that the cutter units are identical in construction and, therefore, it is necessary to describe only one of them and its means of attachment to the carrier.

As shown more clearly in Figures 4 and 5, the rotary carrier A is provided with a multiplicity of circular recesses $a'$ open at the periphery thereof for receiving a corresponding number of radial blocks 1 of similar diameter, each of said blocks being seated in its corresponding recess against the bottom thereof and held in place by a pair of clamping screws 2 which are passed through corresponding openings in the block and engaged in threaded apertures in the carrier A for releasably holding the blocks in operative position with their axes substantially radial to the axis of rotation of the carrier.

The recesses $a'$ and blocks 1 are preferably arranged in one or more circular rows and in uniformly spaced relation around the periphery of the carrier, each block being of less transverse width than the diameter of its recess in the direction of rotation of the carrier, leaving ample space 3 at opposite sides thereof for the reception of parts of a cutter unit hereinafter described, the opposite faces of each block being substantially flat and parallel to form end thrust bearings for holding the cutter unit against axial movement relatively to the carrier.

These partition blocks also extend radially equal distances from and beyond the periphery of the carrier for receiving a corresponding number of pivotal pins 7 which are supported in corresponding transverse apertures 6 in their respective blocks midway between the ends thereof and parallel with the axis of the carrier with their axes in the pitch circle or peripheral bearing $a$ of said carrier.

Each pivotal pin 7 extends equal distances from and beyond its supporting block 1 for receiving and hingedly supporting one of the cutter units and permitting the latter to swing or tilt endwise in the direction of length of and in proximity to the periphery of the carrier in a manner presently described.

The partition block 1 is provided with a central opening 5 therethrough to reduce its weight.

It is, of course, understood, that there will be as many cutting units as there are supporting blocks 1 and that they will preferably be arranged in uniformly spaced relation circumferentially around the periphery of the carrier A.

Each cutting unit, as shown in Figures 1 to 6 inclusive comprises a circular supporting plate 8, a cutting ring or die 9, and an ejector plate 10 together with releasable means for holding the cutter ring and its supporting plate against relative axial movement and additional means for yieldingly supporting the ejector plate upon said supporting plate.

The supporting plate 8 is provided with a pair of similar lugs 11 projecting from one of its inner end faces in spaced parallel relation a distance apart corresponding to the thickness of the partition 1 so as to extend into the recesses 3 in the carrier A in engagement with opposite sides of said partition, as shown in Figure 5, said lugs being provided with similar elongated slots 12 for receiving the opposite ends of the pivotal pin 7 and thereby establishing what may be termed a slot end pin connection between the plate 8 and block 1 which, when secured in place, forms a unitary part of the carrier A.

It is now clear that each cutting unit is hingedly mounted upon the opposite ends of its corresponding pivotal pin 7 and thereby hingedly connected to the carrier to swing about the axis of said pin which, as previously stated, is parallel with the axis of rotation of the carrier so that the cutting unit may swing lengthwise of the periphery of said carrier.

The length of the slots 12 is somewhat greater than the distance between the inner face of the cutter ring 9 and periphery of the carrier A so that when the inner end wall of the slot is engaged with the pivotal pin 7 the upper face of the cutter ring 8 will be in sufficiently spaced relation to the periphery of the carrier to allow a limited rocking movement of the cutting unit about the axis of the pin in the direction of length of the peripheral bearing $a$ and will also permit radial movement of said cutting unit relatively to the supporting block 1 to bring the inner face of the cutting ring 9 into engagement with the peripheral bearing $a$ in a manner and for a purpose presently described.

The inner end of the cutter ring 9 is provided with an inturned annular flange 13 and an outturned annular flange 14 at right angles to the flange 13 which latter is adapted to rest upon the inner face of the marginal edge of the supporting plate 8 where it is held in place by clamping plates 15 and clamping screws 16.

That is, the clamping plates 15 are interposed between the outer faces of the lugs 11 and inner edge of the flange 13, while the screws or clamping bolts 16 are passed through apertures in the clamping plates and engaged in threaded apertures or sockets 16' in the supporting plate 8.

The inner marginal edge of the flange 13 is beveled at 13' while the outer edges of the clamping plates 15 are similarly beveled so that when engaged with the beveled edge 13' they will loosely hold the cutter ring 9 in operative position upon its support 8 for angular movement.

The clamping plates 15 and bolts 16 constitute releasable means for holding the cutter ring 9 in place and while reasonably tight to prevent appreciable axis movement of the ring, are sufficiently loose to permit the ring 9 to be adjusted rotarily to different positions so that different portions of the cutting edge of the cutting ring may be brought into initial engagement with the work as the cutter unit is fed between the bearing surface $a$ of the carrier and the bearing surface $c$ of the platen.

The outer edge of the outturned flange 14 of the cutter ring 9 is provided with inner and outer beveled surfaces 17 and 18, and an extremely narrow and flat annular cutting edge 19 parallel with the opposite end face of the ring so as to become self-sharpening through wear of the corners when in use, see Figure 15.

The angle of inclination of the inner beveled edge 17 relatively to the axis of the cutting unit is considerably less than that of the outer beveled surface 18, the object of which is to effect a self-sharpening of the cutting edge by the engagement of the work therewith and at the same time to keep the cutting edge at the same diameter and all portions thereof in substantially the same plane as the cutting edge is worn by contact with the sheet material during the cutting operation.

That is, the two bevels 17 and 18 are arranged to bring the annular cutting edge of the cutting ring substantially midway between the inner and outer walls of the flange 14 so that as the beveled edges wear, the cutting edge will remain at the same diameter.

The ejector plate 10 is also circular and of about the same diameter as the interior diameter of the lower end of the cutter ring 9 and is yieldingly supported upon the plate 8 by means of screws 20 and sleeves 21 having their outer ends threaded internally and engaged by the screws 20, as shown more clearly in Figure 6.

The screws 20 are passed from the outside inwardly through countersunk openings in the ejector plate and serve to limit the outward movement of the ejector plate relatively to the supporting plate 8.

The inner ends of the sleeves 21 are provided with heads loosely seated in corresponding recesses 21′ in the adjacent inner face of the plate 8 to assist in limiting the outward movement of the ejector plate 10.

The ejector plate 10 is yieldingly held in its outermost position by coil springs 22 having their outer ends engaged with the inner face of the ejector plate and their inner ends seated in suitable sockets 23 in the underside of the supporting plate 8.

The springs 22 and threaded members 20 and 21 are arranged in such relation as to normally hold the plate 8 in spaced relation to and parallel with the outer face of the supporting plate 8 and also in a plane parallel with the plane of the cutting edge 19 of the cutter ring 9 with the lower face of the ejector plate projecting outwardly slightly beyond the plane of said cutting edge so as to prevent contact of the cutting edge of the cutter 9 with the periphery of the platen C when the cutting units are running idle or rather when no sheet material is present between the cutting edge of the cutter and periphery of the platen.

The carrier A and platen C are rotatable about relatively fixed axes, preferably in the same vertical plane, and are arranged in vertically spaced relation along said plane a distance apart substantially equal to but slightly greater than the distance between the lower cutting end 19 and inner bearing face as 19′ of the cutter ring 9.

The cutting edge 19 and opposite end bearing face 19′ are disposed in parallel planes a distance apart only slightly less than the distance between the adjacent faces of the carrier A and platen C so that when the cutter unit is fed by and between said adjacent faces as a and c with the sheet material between the cutting edge and bearing surface c, the cutting edge 19 will cut through the major portion but not quite through the thickness of the material, thus preventing contact of the cutting edge 19 with the peripheral bearing surface c of the platen, it being understood that the sheet material will be yieldingly held against the periphery of the platen by the ejector plate 10 under the pressure of the comparatively stiff springs 22.

It is now clear that when the carrier A is rotated in the direction indicated by arrow X, Figure 4, the cutting units will be brought successively between the periphery of the carrier and that of the platen C.

During this time the sheet material as B will be simultaneously fed between the cutting edge 19 of the cutter ring 14 and the periphery c of the platen C, thereby causing the cutter edge 19 to pass through the major portion but not quite the full thickness of the sheet material B for cutting out a corresponding circular disk as D, Figure 7.

During this cutting operation, it will be noted that the cutting unit and particularly the cutting element 9 is fed forwardly by and between the rollers independently of its slot or pin connection with the carrier A and that as each cutting operation upon the sheet material is completed the cut out portion as D will be expelled or detached from the sheet by the ejector plate 10 under the action of the springs 22.

That is, as soon as the advance side of the cutting unit is brought to a position between the bearing faces a and c of the carrier A and platen C with the sheet material as B in position to be acted upon the cutter, the cutting unit and sheet material will be caught between the bearing faces a and c and thereby fed forwardly by the rotation of the carrier A.

As the forward side of the cutter and sheet material pass beyond the vertical plane of the axis of the rotary elements A and C, the adjacent side of the ejector plate 10 will be forced outwardly by the adjacent spring 22 to detach the same from the remnant of the sheet material, this ejecting operation being continued as all portions of the cutting edge 19 pass beyond said plane, thereby completing the ejection of the circular disks as D from the remnant of the sheet.

It will be noted upon reference to Figure 4 that the upper end of each slot 12 is about the same radius as the pin 7 while the remaining portions are gradually enlarged outwardly toward the plate 8, the object of which is to hold the lugs 11 of the cutting units in definitely spaced relation circumferentially upon the periphery of the carrier A and to assure the entrance of the front sides of the cutting units between the adjacent faces of the rotary elements A and C, whereupon the feeding operation of the cutting unit and sheet material is continued by impingement between the bearing faces a and c independently of the pins 7 which might otherwise interfere with the free self-adjustment of the cutter units tangential to the peripheries of the rotary elements A and C.

In other words, as soon as the forward side of the cutting unit and sheet material are brought into the vertical plane of the axes of the rotary elements, the automatic feeding of the units by said elements begins and continues until each unit has passed beyond the vertical plane of said axis during which time the pivotal pins 7 will have moved into the lower and larger ends of their respective slots, thus freeing the pin from engagement with either of the walls of said slots and permitting the rollers A and C to feed the units tangentially to and between them, it being understood that the inner end faces 19′ of the units will then bear against the peripheral faces a while the cutting edge 19 will bear directly upon the sheet material and impinge the same against the peripheral face c of the platen C to effect the cutting of the circular disks from the sheet.

The modified construction shown in Figures 8 to 14 inclusive is designed to cut and score what is commonly known as cover or skirted caps for milk bottles and the like, in which the cutting edge as 19″ is multisided or, in this instance, hexagonal, and of greater diameter than that shown in Figures 1 to 6 inclusive.

In this modification, I have shown a supporting plate 8' upon which the cutter as 9' is mounted, said cutter having its inturned flange secured directly to the upper face of the support 8' by releasable means such as screws 20' thereby avoiding the use of the clamping plates 15, shown in Figures 1 to 6 inclusive.

This cutter unit is adapted to cut and score multi-sided or skirted caps or disks as D', Figure 14, and for this purpose the supporting plate 8' is provided with scoring blades 25 and 26 tightly fitted in corresponding grooves in the lower side thereof with their lower scoring edges disposed in about the same plane but slightly above the plane of the cutting edge 19'' of the ring 9' so as to score the disk as D' along the lines 25' and 26', as shown in Figure 4, simultaneously with the cutting operation, see Figures 11 and 12.

That is, the score blades 26 are arranged radially to the axis of the cutter unit while the score blades 25 are arranged along the sides of a hexagon coaxial with said axis so that when the score lines are formed upon the disk D' the central hexagonal portion may rest upon the top of the bottle, while the outer portions between the score lines 26' may be folded downwardly around the outside of the mouth of the bottle.

In this modified construction, I employ a plurality of, in this instance 18, ejectors 10' consisting of cup-shaped bushings slidably mounted in apertures 27 in the supporting member 8' with their lower ends closed to engage the corresponding wings of the cap D' and their upper ends open for receiving coil springs 22' having their lower ends engaged with the bottoms of their respective ejectors and their upper ends engaged with the inturned flange 13'' of the cutter ring 9', as shown in Figure 11.

The inner ends of the ejectors 10' are arranged in spaced relation to the flange 13'' to allow limited endwise movements of said ejectors against the actions of the springs 22', said inner ends of the ejectors being flanged outwardly into corresponding recesses in the upper side of the support 8' to limit the outward movement of said ejectors under the action of the spring.

The outer faces of the ejectors 10' project slightly beyond the cutting edge 19'' to ride against the periphery of the platen roller C and thus prevent the engagement of the cutting edge with said periphery when no sheet material is present between the cutting edge and platen.

The supporting plate 8' is provided with lugs 11 having slots 12 similar to those described for the construction shown in Figures 1 to 6 inclusive.

Otherwise, the construction and operation is quite similar to that previously described.

In Figures 1 to 7 inclusive, however, the fastening means for the cutter ring 9 may be released to allow said ring to be turned about its axis for presenting different portions of its cutting edge forwardly for initial engagement with the sheet material during the cutting operation.

Operation

When the cutting elements are attached to the carrier in the manner described, they are free to rock about the axis of their supporting pins 7 until their forward sides are brought between the periphery of the carrier and platen during which the sheet material B will be fed between the cutting edge and platen to move forwardly therewith whereby the impingement of the cutting edge of the cutter against the paper and against the periphery of the platen C will cause the discs D, Figure 7, or D', Figure 14 to be cut out from the sheet and simultaneously expelled therefrom by the ejector plates 10, Figures 1 to 6, or by ejectors 10', Figures 8 to 13.

During this operation the cutter units will be successively fed tangentially to and between the rollers A and C together with the sheet material B independently of the carrier pins 7 so that in effect the only function of the slot and pin connection of the cutting units with the carrier is to bring said cutter units into feeding position by and between the rollers which then continue the feeding of the cutting unit and sheet material independently of the slot and pin connections.

What I claim is:

1. In a machine for cutting disks from sheet material, the combination with opposed rollers between which the material is adapted to be fed, a cutter-support hingedly connected to one of the rollers, a cutter secured to said support and having its cutting edge extended around and beyond the outer face of the support, and an ejector yieldingly mounted on the support within the marginal edges of the cutter and having its outer face normally disposed in a plane slightly beyond that of the cutting edge to protect said edge against contact with the supporting means for the sheet material in the absence of such material.

2. In a machine for cutting disks from sheet material, a rotary platen having a peripheral bearing surface with which the sheet material is adapted to engage, a carrier having a bearing surface movable transversely across the bearing surface of the platen in spaced relation thereto, a cutter ring having one end provided with a cutting edge disposed in a plane at right angles to its axis and its other end provided with a bearing surface in a plane parallel with that of the cutting edge, the distance between said planes being slightly less than the distance between the bearing surfaces of the carrier and platen, and means on the carrier for feeding the cutter ring into position to be fed with the sheet material by and between the bearing surfaces of the carrier and platen whereby the cutting edge will penetrate the major portion of but not quite through the thickness of the sheet material, said means including a slot and pin connection in which the axis of the pin is substantially coincident with the bearing surface of the carrier.

3. In a machine for cutting articles from sheet material, a carrier and an opposed platen having adjacent bearing faces movable in the same direction, a cutter having a cutting edge arranged about an axis, a support for the cutter, means including a slot and pin connection for mounting the support upon the carrier in which the axis of the pin is substantially coincident with the bearing face of the carrier.

4. In a machine for cutting disks from sheet material, in combination with opposed rollers, a support hinged to one of said rollers, a cutter mounted on the support and having its cutting edge projecting beyond the outer face thereof, and an ejector yieldingly mounted on the support and having its outer face normally projecting beyond the cutting edge.

5. In a stamping machine of the character described, the combination with opposed rollers between which the material to be stamped is adapted to be fed, of a stamping die hingedly connected to one of the rollers to swing about an axis in the periphery thereof and provided with a cutting edge adapted to engage said material.

6. In a stamping machine of the character described, the combination with opposed rollers between which the material to be stamped is adapted to be fed, of a pivotal pin mounted on one of the rollers with its axis in the periphery thereof, a stamping die having lost motion connection with said pivotal pin whereby the die is fed between the rollers and is free to move radially relatively to said pin.

OSCAR C. KAVLE.